Figure 1:
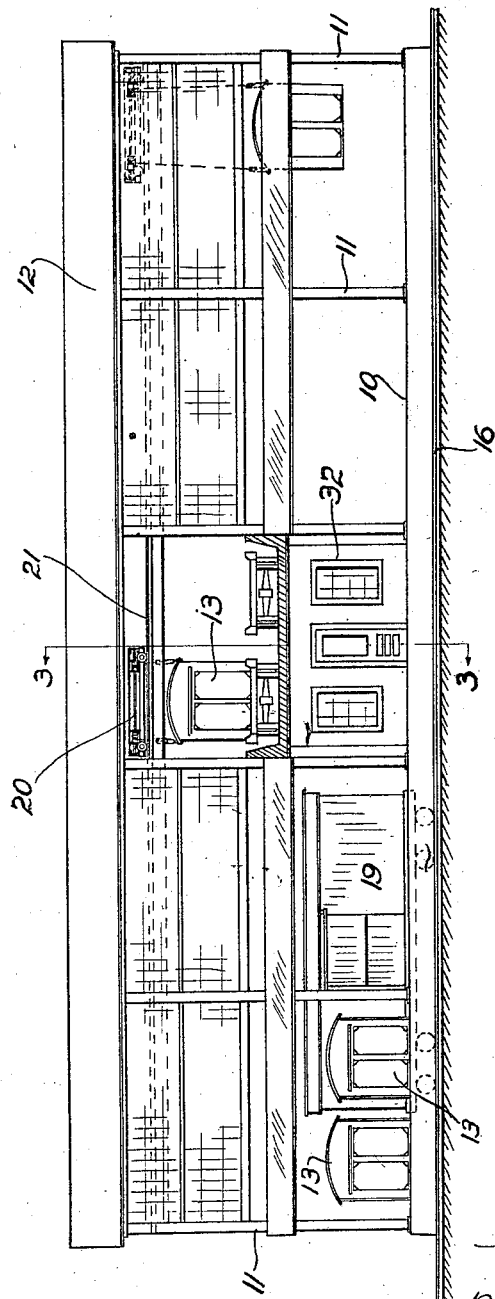

Sept. 21, 1926.

B. F. FITCH 1,600,811

APPARATUS FOR TRANSFERRING FREIGHT

Filed April 8, 1924     4 Sheets-Sheet 1

INVENTOR
Benjamin F. Fitch,
By Baker & Macklin,
ATTORNEYS

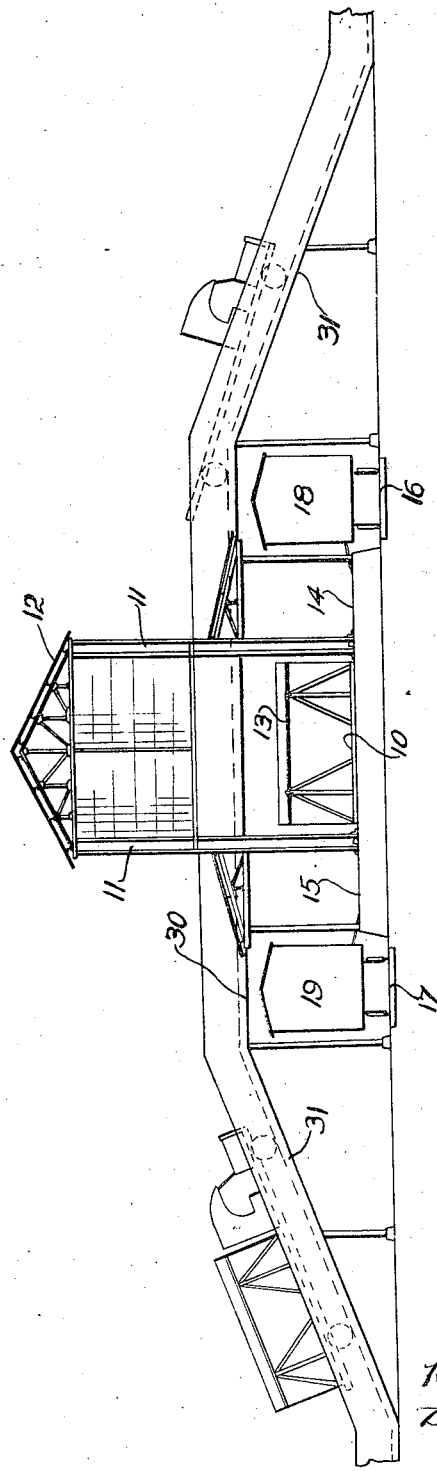

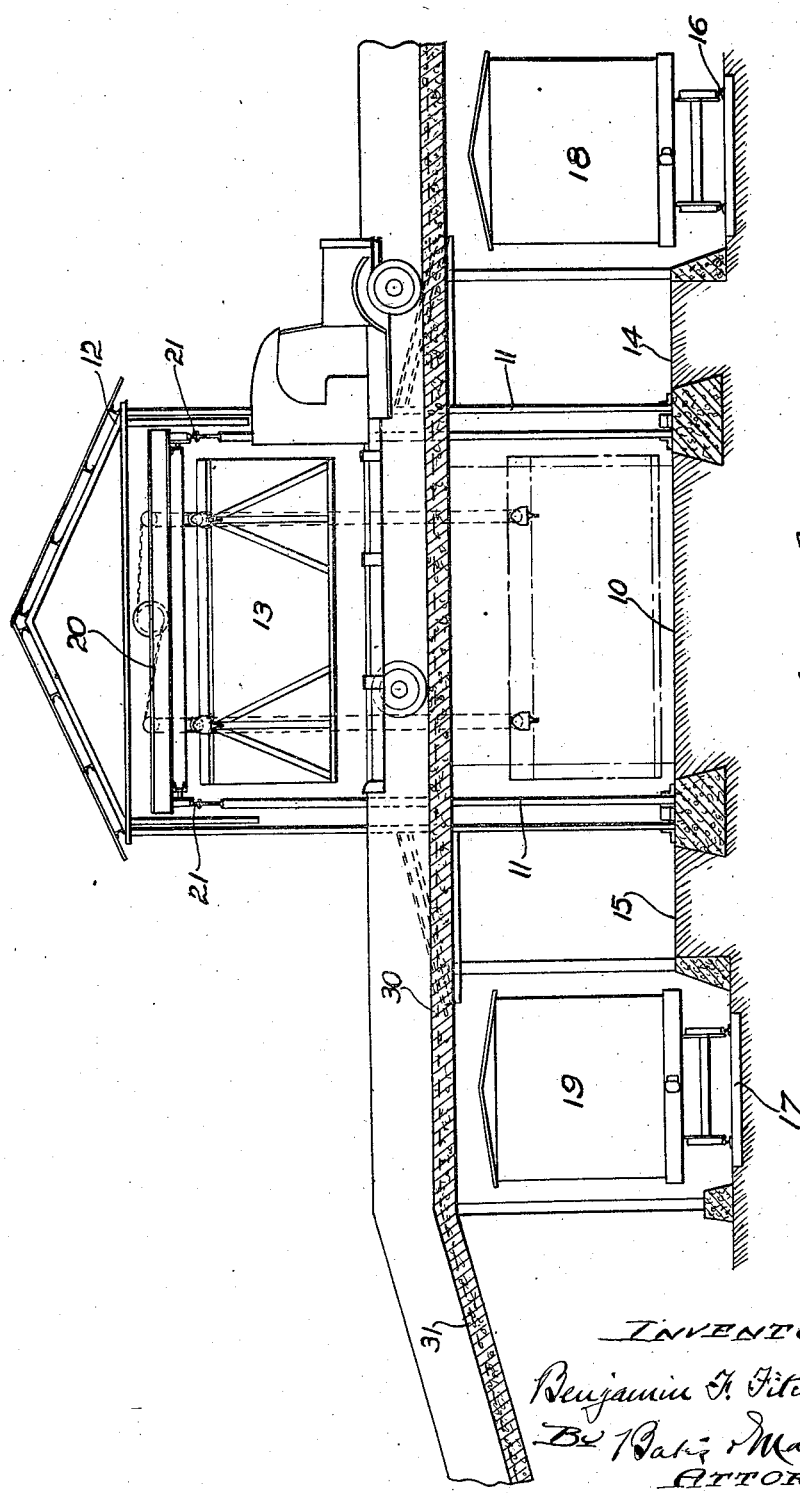

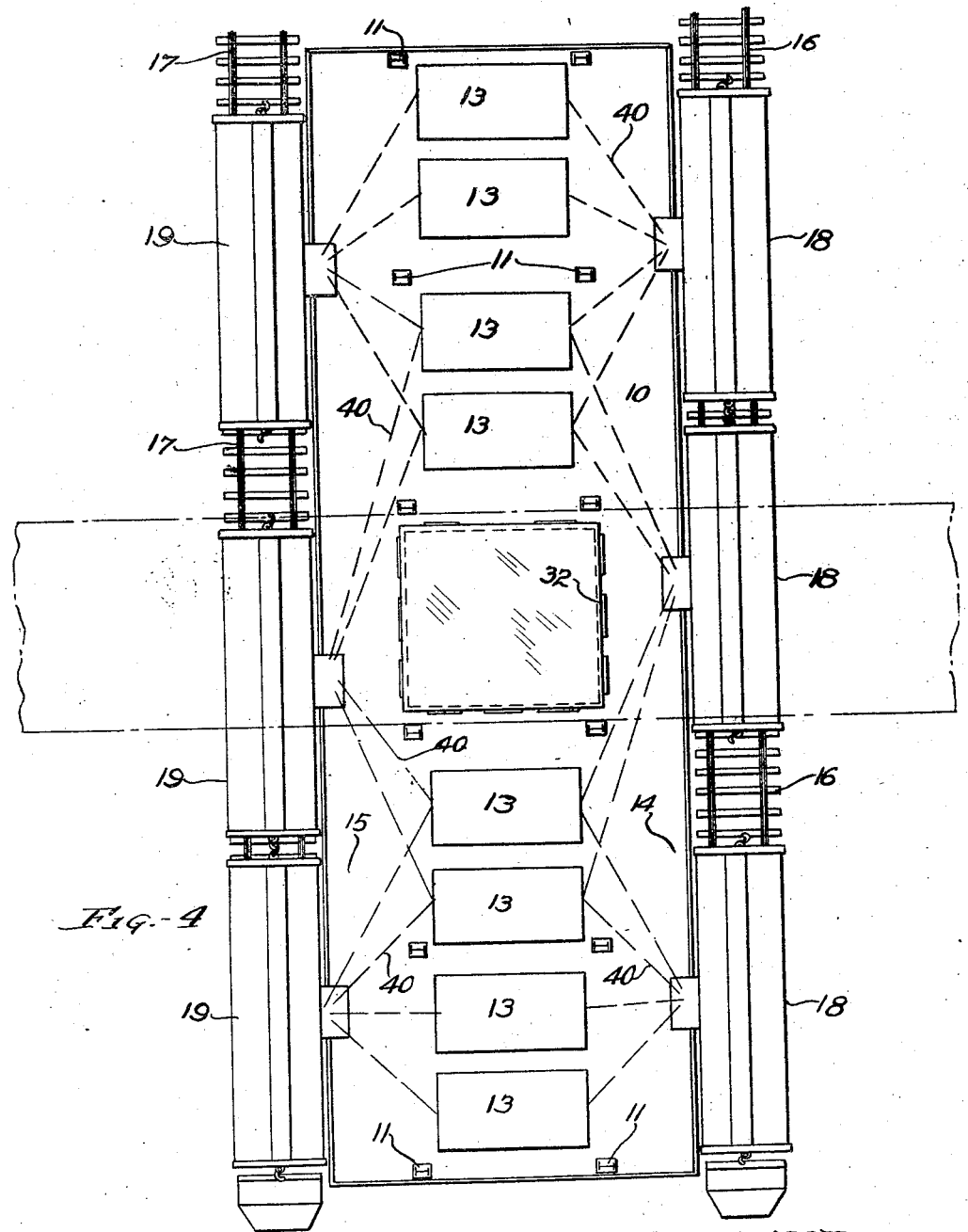

Patented Sept. 21, 1926.

1,600,811

UNITED STATES PATENT OFFICE.

BENJAMIN F. FITCH, OF GREENWICH, CONNECTICUT.

APPARATUS FOR TRANSFERRING FREIGHT.

Application filed April 8, 1924. Serial No. 704,967.

This invention relates to a system for handling freight such as is used for example in a terminal station for the distribution of package freight in less than carload lots. My invention is particularly applicable for use with a system for handling freight wherein removable automobile bodies are used for storing and transporting purposes.

In handling package freight involving less than carload lots, it is necessary, particularly at terminal stations, to "break bulk" for removing some or all of the freight and transferring it either to sub-stations or to cars for direct line movement. Usually this transfer is accomplished by positioning the cars to be loaded and unloaded adjacent the platform, and by hand trucking the freight from one car to another across the platform. These transfer cars are then destined either for direct line movement, or for sub-station transfer for similar rehandling purposes.

The handling and distribution of package freight at terminal stations necessitates considerable time in the handling of each package individually from a transfer truck to the platform and then from the storage place on the platform to the proper car. Accordingly to lessen the time required for such handling and distribution I have set forth a system embodying the use of removable automobile bodies in Patent No. 1,437,968, issued to me December 5, 1922. Briefly that patent shows a freight platform having railroad tracks extending longitudinally thereof and on each side for substantially the entire length. Adjacent the end of the platform, there is shown a truck runway together with suitable provision for raising an automobile body from the truck and transporting it over the platform. While the application of my invention as set forth in that patent is suitable for certain locations, nevertheless particularly in cities where the volume of business necessitates a platform extending several city blocks and where the ground space is exceedingly valuable, it is difficult to provide truck run-ways at the end of the platform without causing such run-ways to cross the railroad tracks. Moreover certain cities prevent the use of a freight terminal wherein vehicles must cross the grade adjacent the terminal for loading and unloading purposes.

One of the objects of my invention therefore is the provision of means for permitting the normal use of the system outlined in the above mentioned patent, without necessitating a grade crossing, and at the same time enabling the transfer to and from the truck to be made expeditiously.

A further object of my invention is the provision of a freight platform which not only permits the normal functioning of the system outlined in the above mentioned patent, but also permits the normal flow of traffic along a public thoroughfare over which the station may extend.

The preferred means for accomplishing the above objects is illustrated in the accompanying drawings as embodying an overhead truck run-way and will be hereinafter fully described in detail, while the essential features and characteristics will be summarized in the claims.

In the drawings Fig. 1 is a side elevation of a side elevation of a terminal station made in accordance with my invention; Fig. 2 is an end elevation of the station shown in Fig. 1; Fig. 3 is a section taken on the line 3—3 in Fig. 1; and Fig. 4 is a plan view of the ground floor of the station shown in Fig. 1.

I have illustrated the use of my invention as embodying a terminal station having a platform 10 which supports the columns 11 of an overhead structure indicated in general at 12. The space on the platform extending between the columns provides for the storage of removable automobile bodies 13 while the spaces outside the columns, as at 14 and 15, constitute truck run-ways for the hand trucking of freight to and from the bodies.

The station platform is arranged to be positioned intermediate sets of railroad tracks 16 and 17 on which are positioned cars 18 and 19 which may be designated inbound or outbound, respectively. The building comprising the station is illustrated as a two story structure which is provided with a crane run-way. A cane 20 is shown as traveling on a trackway 21 which extends longitudinally of the freight platform.

To bring automobile truck bodies into position to permit removal thereof from the trucks and transference to the platform I have shown an overhead truck runway which extends across the tops of the cars and has ramps 31 which lead from the runway to the street level.

An advantage of my invention is the fact that the truck run-way may be disposed adjacent the mid-portion of the station wherefore the distance through which the crane must travel for transferring removable truck bodies between the platform and truck is materially reduced, over an arrangement wherein the truck run-way is disposed adjacent the end of the station platform. This saves considerable time in the course of a working day. A further advantage of my invention is that the space within the station and beneath the truck run-way may be used as an office as indicated at 32. Moreover the loading and unloading of cars may be carried on simultaneously with the loading and unloading of automobile bodies as set forth in the patent heretofore mentioned, while other bodies are being transferred overhead between the trucks and platform in an expeditious manner. The broken lines 40 as shown in Fig. 4 illustrates the convenience afforded for transferring the contents of cars to the bodies and vice versa. If desired, a station may have a plurality of overhead truck run-ways at spaced intervals whereby one train trackway may be used for a number of trains and the expansion of the station may thereby be readily accomplished in accordance with the requirements for freight being handled.

I claim:

1. In combination, a station platform, means for supporting transportation devices in a row extending longitudinally of the platform, a set of removable automobile bodies, an automobile truck runway extending transversely of the platform and spaced vertically therefrom a distance greater than the height of one of said bodies, and a crane at such elevation above the platform and runway that it may raise a body from a truck on the runway, transport it over other bodies and deposit it upon the platform, the space between the platform and crane being unobstructed for substantially the entire length of the platform, whereby a body may be deposited at any place upon the platform.

2. In combination, a station platform, means associated with the platform for supporting transportation devices in a row alongside the platform, a roadway on substantially the same level as said means, a truck runway communicating with the roadway and extending transversely of the platform, an automobile truck, a set of removable bodies therefor, said runway having that portion adjacent the platform at a different level from the roadway and spaced vertically from the platform a distance greater than the height of said bodies, hoisting mechanism for removing a body from a truck positioned on the runway and placing it on the platform, the space between the platform and mechanism being unobstructed for substantially the entire length of the platform whereby said body may be deposited at any place on the platform.

3. In combination, a station platform, a set of removable automobile bodies, the platform being materially wider than the length of a body, whereby the bodies may stand transversely of the platform and leave a trucking space extending lengthwise of the platform, a set of railroad tracks extending alongside the platform, an overhead truck runway extending transversely of the platform and also over the tracks, a ramp at one end of the runway leading downwardly to the track level, an overhead crane arranged to travel lengthwise of the platform and adapted to lift a body from a truck positioned on the runway and to deposit it upon the platform, the crane runway on each side of the truck runway being unobstructed for substantially the entire length of the platform, whereby the crane may transport a body and deposit it at any place upon the platform.

4. In combination, a station platform, a set of railroad tracks extending longitudinally of the platform and substantially on the same level therewith, an overhead truck runway extending over the platform and transversely thereof, a ramp leading downwardly from each end of the runway to the track level, and an overhead crane above the runway, said crane being adapted to travel longitudinally of the platform, the space between the platform and the crane excluding the truck runway, being unobstructed whereby the crane may raise a body from the truck on the runway, transport it over other bodies and deposit it at any place upon the platform.

5. In combination, a station platform, a set of railroad tracks extending alongside the platform, a roadway leading away from the tracks at substantially the same level as the tracks, said roadway constituting a public thoroughfare, a set of removable automobile bodies adapted to be positioned side by side on the platform, an overhead truck runway extending transversely of the platform, there being a ramp leading downwardly from the runway at each end thereof for making the runway constitute a continuation of the public thoroughfare, and a traveling crane extending longitudinally of the platform and adapted for raising bodies from trucks and transporting them over other bodies on the platform, the crane runway being unobstructed for substantially the entire length of the platform, whereby a body may be deposited at any place on the platform.

In testimony whereof, I hereunto affix my signature.

BENJAMIN F. FITCH.